(12) United States Patent
Kitade

(10) Patent No.: US 7,170,204 B2
(45) Date of Patent: Jan. 30, 2007

(54) SLIDING DEVICE WITH ONBOARD MOVING-MAGNET LINEAR MOTOR

(75) Inventor: Norimitsu Kitade, Kamakura (JP)

(73) Assignee: Nippon Thompson Co., Ltd., Tokyo (JP)

( * ) Notice: Subject to any disclaimer, the term of this patent is extended or adjusted under 35 U.S.C. 154(b) by 114 days.

(21) Appl. No.: 11/098,532

(22) Filed: Apr. 5, 2005

(65) Prior Publication Data

US 2005/0258689 A1    Nov. 24, 2005

(30) Foreign Application Priority Data

May 18, 2004    (JP)    ............................. 2004-147906

(51) Int. Cl.
*H02K 41/00*    (2006.01)
*H02K 41/03*    (2006.01)

(52) U.S. Cl. ...................................................... 310/12

(58) Field of Classification Search ............ 310/12–14, 310/268; 318/135
See application file for complete search history.

(56) References Cited

U.S. PATENT DOCUMENTS

| 5,072,144 | A  | * | 12/1991 | Saito et al. .................... 310/12 |
| 5,825,104 | A  |   | 10/1998 | Kondo et al. |
| 5,852,104 | A  | * | 12/1998 | Kokel et al. ................. 524/591 |
| 6,191,507 | B1 | * | 2/2001  | Peltier et al. .................. 310/12 |
| 6,239,516 | B1 | * | 5/2001  | Floresta et al. ............... 310/12 |
| 6,326,708 | B1 | * | 12/2001 | Tsuboi et al. ................. 310/12 |
| 6,700,228 | B1 | * | 3/2004  | Teremachi et al. ............ 310/12 |

FOREIGN PATENT DOCUMENTS

| JP | 9-266659   | 10/1997 |
| JP | 2002-010617| 11/2002 |

* cited by examiner

*Primary Examiner*—Tran Nguyen
(74) *Attorney, Agent, or Firm*—Browdy and Neimark, PLLC

(57) ABSTRACT

A sliding device is provided which is convenient for manufacturing at high production efficiency the small sliding device, which meets the requirements for high propulsion, high response and long traveling stroke. The sliding device includes a field magnet of eight poles lying on the table, and an armature assembly of twelve coreless armature windings of rectangular shape, which are installed on the bed in opposition to the field magnet. The table is made with a recess sinking by a depth not more than a thickness of the field magnet to make it easier to set in place the field magnet.

8 Claims, 15 Drawing Sheets

SLIDING DEVICE WITH ONBOARD MOVING-MAGNET LINEAR MOTOR

FIELD OF THE INVENTION

The present invention relates to a sliding device that has been extensively used in fields as diverse as semiconductor industries, various assembling machines, precise measuring/inspection equipments, testing machines, machine tools, and so on.

BACKGROUND OF THE INVENTION

Recent sliding devices have been needed to meet anticipated design specifications in extensively increased fields as diverse as semiconductor industries, various assembling machines, precise measuring/inspection equipments, testing machines, machine tools, and so on. An example of the small sliding device with onboard linear motor is disclosed in, for example Japanese Patent Laid-Open No. H09-266659 in which a moving table is made of magnetic material including steel, and so on and is installed thereon with field magnets to serve as a magnet yoke for magnetic circuit, while a stationary bed is also made of magnetic material to serve as a magnet yoke for magnetic circuit of armature windings.

Disclosed in Japanese Patent Laid-Open No. 2002-10617 is a sliding device with onboard moving-magnet, which is made smaller in construction and higher in propulsion as well as in speed response, compared with the small sliding device with onboard linear motor as recited earlier. With the prior sliding device recited here, an auxiliary magnet is placed out of N-pole of forward and aft magnetic end poles of the field magnet to makes up for the magnetic flux pattern at the end pole of the field magnet, thereby getting the magnetic sensor element detect an accurate position of the field magnet. Moreover, accurate position of the moving table is sensed by means of the magnetic sensor element that is arranged on the stationary bed in opposition to the field magnet. The auxiliary magnet is magnetized in a polarity unlike the associated end pole of the field magnet and made less in size to minimize the influence owing to the interaction of the armature windings with the auxiliary magnet on the propulsion given to the moving table from the field magnet. The auxiliary magnet constructed as stated above serves to rectify the magnetic flux pattern at the end pole of the field magnet, which might otherwise deviate outwardly, thereby making sure of the same magnetic flux pattern as in the magnetic flux found at a boundary between any two adjacent magnetic poles in the field magnet. Thus, this auxiliary magnet makes it possible to sense any end pole of the field magnet with the same accuracy as at the boundary between the two adjacent poles in the field magnet. The stationary bed and moving table are both made of magnetic material while the field magnets made of rare earth magnet are placed on the moving table. Besides the auxiliary magnet, there are arranged an end plate and a sensor magnet on the moving table, while the stationary bed has thereon an armature assembly for three-phase conduction system. The prior sliding device is envisaged making the sliding device small in construction even with high in propulsion and speed response. Moreover, there is provided an optical encoder to ensure highly accurate position control.

With the small sliding device disclosed in the first citation, which is co-pending senior application of common assignment, nevertheless, a recess cut underneath the moving table to secure the field magnets to the moving table is made as deep as the thickness of the field magnet. Even though the field magnet is getting smaller to have up to five poles, the recess remains deep and therefore the magnetic flux of the field magnet fit into the recess would leak out to side walls of the associated recess. If that happens, the magnetic flux heading toward the armature windings might become less intense so that the propulsion to thrust the moving table would result in getting reduced remarkably. Making the deep recess into the moving table, moreover, needs many working steps. In addition, the moving table is made on the lower surface thereof with a raised side ridge that is used to set a slide unit in precise location on the moving table. This construction underneath the moving table would take even more complete processes to produce the moving table. The stationary bed is in the form of H-shape in transverse section, which is made on any one surface thereof with a recess to accommodate the armature windings therein while on another surface thereof with a recess to fit the drive circuit therein. Making the bed into the H-shape sophisticated in construction would also take much effort in working processes. Thus, the small sliding device with onboard linear motor first recited earlier is inconvenient for manufacturing at high production efficiency the small sliding device, which meets the requirements for high propulsion, high response and long traveling stroke.

With the sliding device disclosed in the second citation, which is also co-pending senior application of common assignment, the field magnets are arrayed in flush with one another on the underneath of the moving table. In the prior sliding device constructed as stated earlier, nevertheless, there is no way to install in place the field magnets of even more poles, for example eight poles to cope with the challenge to higher propulsion, higher response, longer traveling stroke, and so on. Moreover, the moving table is made on any one side thereof with a raised side ridge that is used to set a slider in precise location on the moving table. This construction would take even more complete processes to produce the moving table. In addition, the stationary bed is also made on the upper surface thereof with a deep recess to fit the armature windings into there. Cutting deep the recess into the bed would also take much effort in working processes. The bed in this prior sliding device is further cut away partially at lengthwise middle area on any one side of the bed to provide a space to install sensors therein. This also makes the bed in construction more complicated to need much additional working steps.

In recent years, meanwhile, a sliding device with onboard magnet-moving linear motor allowed to operate over a longer stroke is extensively required for use in diverse fields including the semiconductor manufacturing machines, various assembly machines, precise measuring/inspection machines, testing machines, machine tools, and so on. Thus, it remains a major challenge to further develop the sliding devices disclosed in the commonly assigned Japanese Patent application as recited earlier so as to allow the moving table operating over longer traveling stroke, enhancing the propulsion, traveling velocity, high response, and so on, even with small or compact in construction and better in production efficiency.

SUMMARY OF THE INVENTION

The present invention has as its primary object to overcome the subject stated earlier and more particular to provide a sliding device with onboard moving-magnet linear motor, in which a moving table is allowed operating over longer traveling distance or stroke, with serving better performances of high propulsion, high traveling velocity, high response, and so on, even with small or compact in construction and better efficient in production efficiency.

The present invention relates to a sliding device with onboard moving-magnet linear motor, comprising an elongated bed, a table movable for reciprocation in a lengthwise direction by virtue of a linear motion guide unit, a field magnet of magnet segments lying on a first surface of the table confronting the bed in a way unlike magnetic poles are juxtaposed alternately in polarity in a traveling direction of the table, and an armature assembly having coreless armature windings of rectangular shape, which are installed on a second surface of the bed confronting the table in opposition to the field magnet in lengthwise direction;

wherein the bed an the table are made of magnetic material to provide magnet yoke and coil yoke for constituting a part of magnetic circuits, and the table is made on the first surface thereof with a first recess to set in place the field magnet of the magnet segments on the first surface, the first recess having a depth not more than a third a thickness of the field magnet.

In one aspect of the present invention, a sliding device is disclosed in which the first recess cut into the table has the depth of from 0.05 mm to 0.5 mm.

In another aspect of the present invention a sliding device is disclosed in which the field magnet is made up of eight pieces of magnet segment, while the armature assembly is made up of in all twelve armature windings, which are divided into armature winding groups, each of which includes three armature windings for carrying each phase current of three-phase conduction system.

In another aspect of the present invention, sliding device is disclosed in which the bed is made on the second surface thereof with a second recess less in depth than a half a thickness of the armature winding and the armature assembly is flanked by covering materials extending along widthwise opposing sides of the armature assembly to prevent foreign matter against moving in and out.

In a further another aspect of the present invention, a sliding device is disclosed in which the table as a whole is made in a flat configuration with nothing raised above them, while a locating pin is made on any flat area of the table to create a locating point to determine a slider for a linear motion guide unit relative to the table, and wherein the slider fits over and conforms to a guide rail 3 in a way traveling by virtue of rolling elements, thereby providing the linear motion guide unit.

In another aspect of the present invention a sliding device is disclosed in which magnetic sensing elements responding to the field magnet are installed on just six armature windings, which are located in the middle of the armature assembly.

In another aspect of the present invention, a sliding device is disclosed in which a linear scale of a linear encoder is attached to the first surface of the table in a way extending along any one side of the table, while the bed is made on any one side thereof with a third recess, into which a bracket fits to secure a sensor of the linear encoder in opposition to the linear scale.

In a further another aspect of the present invention, a sliding device is disclosed in which a connector block is secured to any lengthwise end of a coil board of the armature assembly at any one of forward and aft ends of the bed, and the connector block, besides serving as a limiter to keep the table from shooting outside the end of the bed, serves protecting terminals that are connected with an electric power line and a signal lines, and wherein the connector block is further made with a fourth recess, into which a retainer band fits to a sensor line reaching the sensor.

The sliding device of the present invention constructed as stated earlier is envisaged further developing the prior sliding device so as to allow a moving table traveling for reciprocation over longer stroke with higher in propulsion, traveling velocity and response ability, compared with the prior sliding device. The sliding device of the present invention is moreover convenient for manufacturing at high production efficiency the small sliding device, which meets the requirements for long traveling stroke, even with small or compact in construction.

The above and other related aspects and features of the present invention will be more apparent to those skilled in the art from a reading of the following description of the disclosure found in the accompanying drawings and the novelty thereof pointed out in the appended claims.

DETAILED DESCRIPTION OF THE PREFERRED EMBODIMENTS

Figure 1:
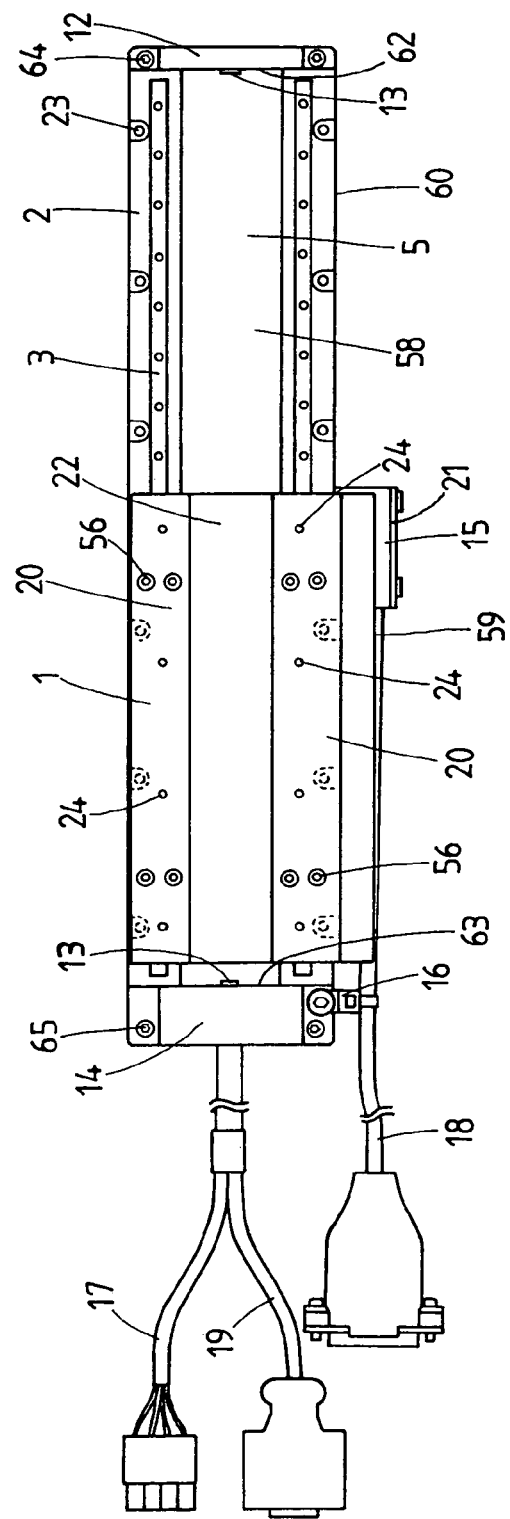
FIG. 1 is a top plan view showing a preferred embodiment of a sliding device with onboard moving-magnet linear motor in accordance with the present invention.
Figure 2:
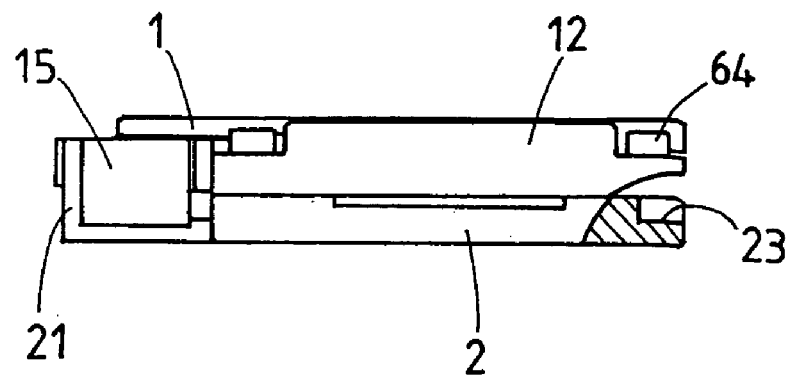
FIG. 2 is a partially broken away view in side elevation of the sliding device of FIG. 1.
Figure 3:
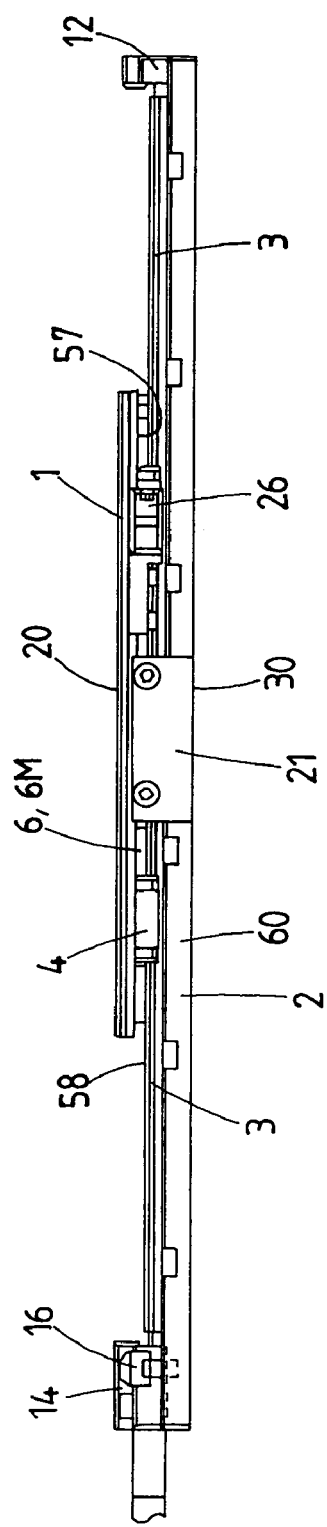
FIG. 3 is a view in front elevation of the sliding device of FIG. 1.

Preferred embodiments of a sliding device according to the present invention will be explained hereinafter in detail with reference to the accompanying drawings. The sliding device with an onboard moving-magnet linear motor is envisaged incorporating it in a diversity of machinery including semiconductor manufacturing equipments, machine tools, various assembling machines, testing instruments, position-control system, sliding table system, and so on, which are expected to operate in controlled atmosphere including clean room, testing/experimental laboratories, and so on.

The sliding device of the present invention is envisaged further developing the existing sliding device disclosed in the commonly assigned Japanese Patent Laid-Open No.2002-10617 so as to allow a moving table traveling for reciprocation over longer stroke, even with slim or compact in the overall construction. The sliding device of the present invention, although in common with the existing sliding device recited earlier in basic functions of most parts and members, is improved to have the functional features distinguishable over the existing sliding device. Constructional feature in the sliding device of the present invention, especially, resides in that a moving table 1 is made with a slight recess 35, or first recess, to make it possible to set in place a field magnet 6 of many magnet segments 6M, from No. 1 to No. 8, which are arrayed across relatively long interval in traveling direction.

The sliding device of the present invention is mainly comprised of an armature assembly 5 having armature windings 7 lying in juxtaposition on a stationary bed 2 of elongated flat plate, and a field magnet 6 lying on a moving table 1 of flat plate, which is allowed to move for reciprocation by virtue of a linear motion guide unit 10. The sliding device of the present invention is provided with an onboard moving-magnet linear motor that is composed of the field magnet 6 of a plurality of the magnet segments 6M arranged on a surface 57 of the moving table 1 facing on the bed 2, or a first confronting surface, in a way unlike magnetic poles alternate in polarity in a traveling direction of the moving table 1, and the armature assembly 5 of a plurality of the coreless armature windings 7 arranged on a surface 58 of the stationary bed 2 facing on the moving table 1, or a second confronting surface, in a way lying juxtaposition lengthwise of the bed 2. There is provided a coil board 11 above the armature windings 7 to cover the armature windings 7 from above. The support plate is made therein with counter sinks 42 that are used to fasten the armature windings 7 to the stationary bed 2, and holes 43 that are used to set in place the coil board 11 relative to the armature windings 7. On finishing the armature assembly 5 in the sliding device, the armature windings 7 are set in place relative to the coil board 11 and then fastened to the bed 2 with using fastening bolts 66 that fit into threaded holes 47 in the bed 2 after having passed through the counter sinks 42 and holes 66 in the armature windings 7.

Figure 8:
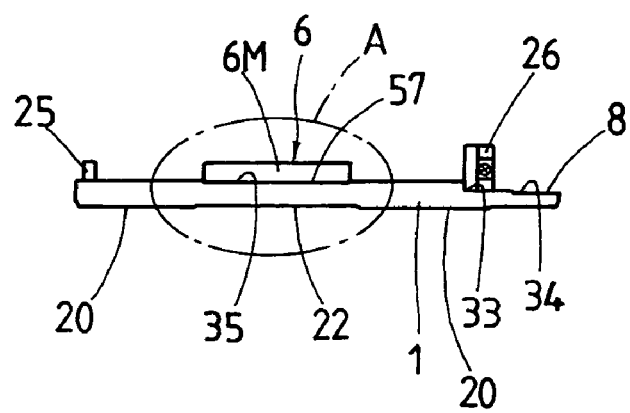
FIG. 8 is a view in side elevation of the moving table of FIG. 7.
Figure 9:
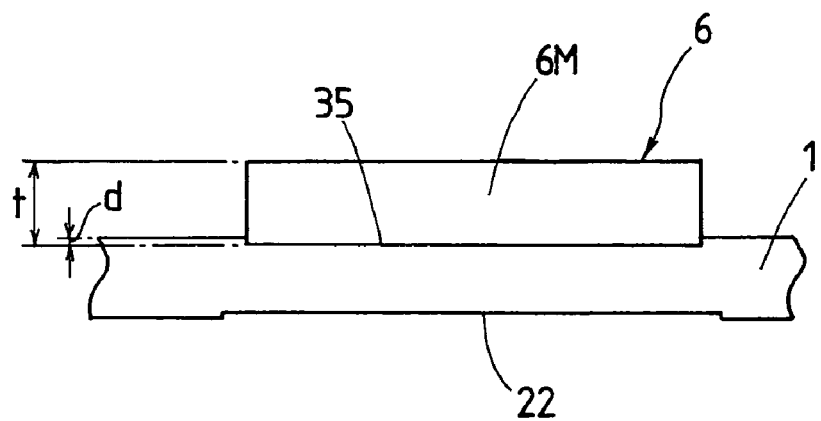
FIG. 9 is an enlarged fragmentary view in side elevation showing just an area (A) of the moving table of FIG. 8.

With the sliding device of the present invention, especially, the moving table 1 and the stationary bed 2 are both made of magnetic material so as to serve as a coil yoke and a magnet yoke, respectively, to establish magnetic circuits. The moving table 1, as shown in FIGS. 8 and 9, is made on the first confronting surface 57 thereof with a recess 35, or the first recess, to make it easier to set in place the field magnet 6 of many magnet segments 6M. The constructional feature in the sliding device of the present invention resides in that the recess 35 is made in depth (d) not more than a third a thickness (t) of the field magnet 6 to lessen any flux leakage through sides 59 defining the recess 35. That is to say, the recess 35 in the moving table 1, so long as sinking by the depth (d) not more than a third, in other words, at the most a third the thickness (t) of the field magnet 6, is sufficient to make it easier to dispose in place the field magnet 6 in the recess 35 with no possibility of causing any misalignment. The constructional feature as stated earlier makes certain of getting the sliding device reduced in its overall height, even with ensuring a satisfactory strength in the moving table 1 as well as a magnetic path enough to actuate the moving table 1. The recess 35 is cut into the moving table 1 in a way extending in the traveling direction of the table 1 with a width enough to receive the field magnet 6 therein. The recess 35 is specially sunk by the depth (d) of substantially the range of from 0.05 mm to 0.5 mm.

With the sliding device of the present invention, the stationary bed 2 has at any one of forward aft ends thereof an end block 12 that is fastened to the bed 2 with screws 64 tightened into threaded holes 52, while at another end thereof a connector block 14 that is fastened to the bed 2 with screws 65 tightened into threaded holes 48. On a surface 62 of the end block 12 coming into engagement with the associated end of the bed 2, there is provided a lock stopper 13 to keep the end block 12 against disengaging out of the bed 1. On a surface 63 of the connector block 14 coming into engagement with the associated end of the bed 2, there is similarly provided another lock stopper 13 to keep the connector block 12 against disengaging out of the bed 2. The lock stopper 13 fits into a fastening hole 54 made in the connector block 14. Moreover, a recess 53 to receive a connector therein is made in the underneath of the connector block 14. On the underneath of the bed 1, there is provided a mounting surface 30 of reference, against which any fixed base such as machine bed and the like come into abutment to determine in place the sliding device relative to the fixed base. The bed 2 is further made on widthwise opposing sides thereof with fastening holes 23 that are used to fasten the bed 2 onto the fixed base including a machine bed, and so on.

With the sliding device of the present invention, the moving table 1 is made on an upper surface thereof with a slight depression 22 extending in the forward-and-aft direction, which is flanked by mounting surfaces 20 of reference, against which any member such as workpiece and the like come into abutment to determine in place the member including a workpiece on the moving table 1. Moreover, the moving table 1 is made with threaded holes 24 at the mounting surfaces 20 of reference, which are used to fasten the member such as the workpiece and the like to the moving table 1. The field magnet 6 is made up of eight pieces of magnet segment 6M, which fit in the recess 35 in the underneath of the table 1 in such arrangement that unlike poles, or N-pole and S-pole, alternate in juxtaposition in the traveling direction of the table 1. An end plate 32 fits into the recess 35 cut into the underneath of the moving table 1 at any one of the lengthwise opposing ends of the recess 35, which looks towards the end block 12. Between the end plate 32 and the associated endmost magnet segment 6M, there is interposed an auxiliary magnet 31 that is unlike in polarity from the endmost magnet segment 6M of the field magnet 6. The end plate 32 fitting in the moving table 1 is to keep the magnetic flux established in the field magnet 6 from leakage out of the auxiliary magnet 31. Moreover, the auxiliary magnet 31 is made less in width in the traveling direction than a width of a coil side of the armature winding 7 to reduce any effect on propulsion rendered to the moving table 1. A sensor magnet 29 fits into the recess 35 cut into the moving table 1 at another lengthwise end of the recess 35, which looks towards the connector block 14. The sensor magnet 29 is unlike in polarity from another endmost magnet segment 6M of the field magnet 6. The stationary bed 2 is provided with a limit sensor 36 to detect the sensor magnet 29, depending on the tolerated range of traveling stroke of the moving table 1 relative to the stationary bed 2.

Figure 4:
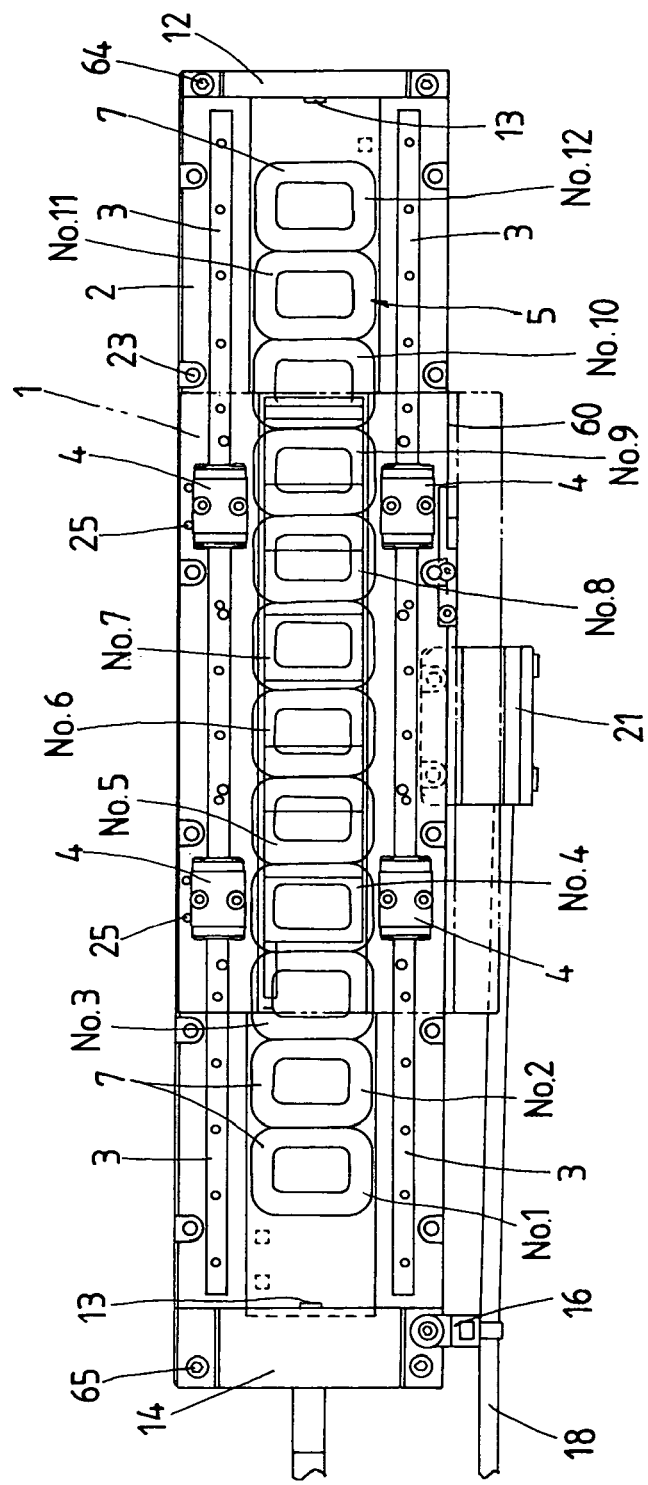
FIG. 4 is a view to explain the interior of the sliding device of FIG. 1, viewed through a moving table.
Figure 7:
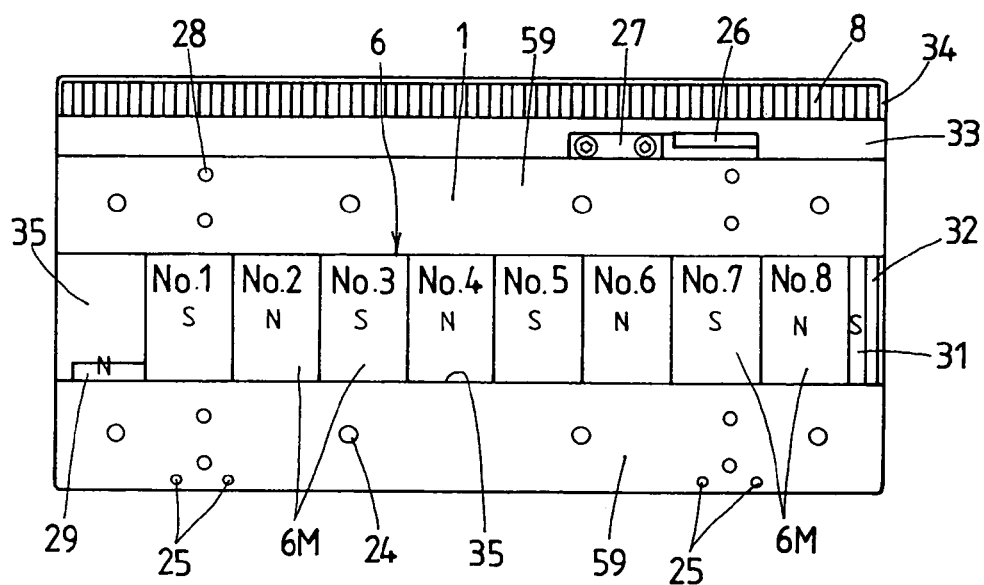
FIG. 7 is a view in bottom plan of a moving table shown in FIG. 6.
Figure 11:
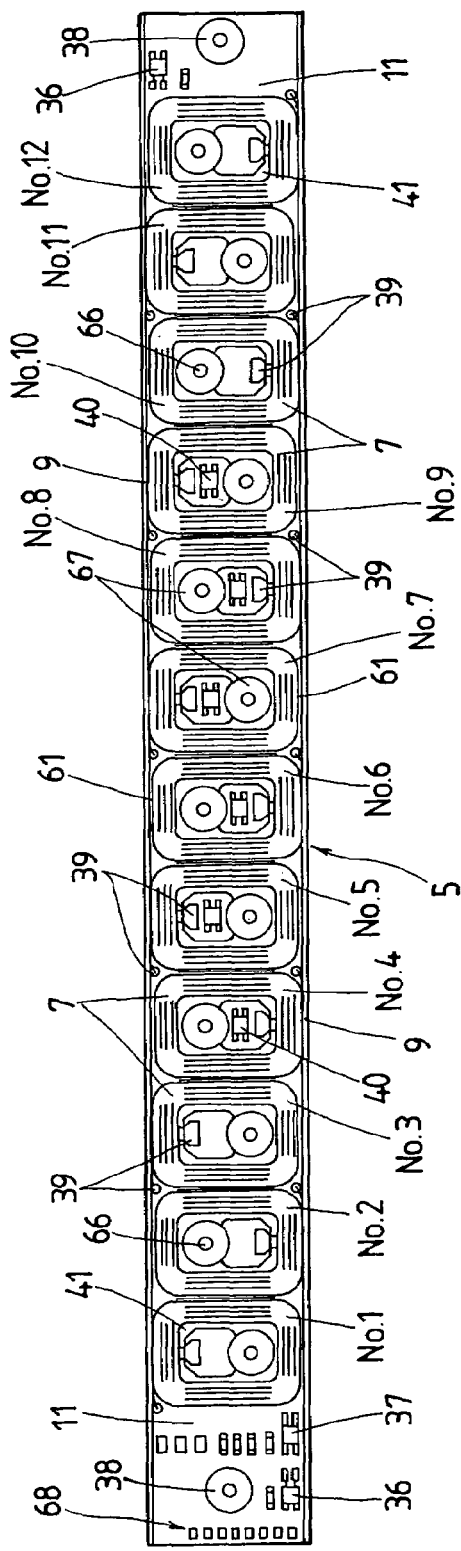
FIG. 11 is a view in rear elevation of the armature assembly of FIG. 10.

With the sliding device of the present invention, as shown in FIGS. 4, 7 and 11, the field magnet 6 is made up of eight pieces of magnet segment 6M: from No. 1 to No. 8, while the armature assembly 5 is made up of in all twelve armature windings 7: No. 1 to No. 12, which are divided into armature winding groups, each of which includes three armature windings 7 for carrying each phase current of three-phase conduction system. The moving table 1 in the sliding device constructed as stated earlier is allowed to travel over a stroke distance (S): 120 mm, which is a matter of twice longer than that (S): 65 mm of the existing prior sliding device.

With the sliding device constructed as stated just above, the twelve armature windings 7 are divided into four armature winding groups, for example No. 1 to No. 3, No. 4 to No. 6, No. 7 to No. 9 and No. 10 to No. 12, each of which includes three armature windings 7 for carrying each phase current of three-phase conduction system. Thus, any armature winding always carries the current resulting from the three-phase conduction system to produce continuously a magnetomotive force that moves the table 1 at synchronous speed. Even if the armature windings increase in number above twelve windings, the sliding device would consume much power and get wasteful. Consequently, the twelve armature windings 7 are preferable in an aspect of energy saving. With the sliding device constructed as stated earlier, the twelve armature windings 7 help increase the allowable traveling stroke of the moving table 1. The combination as stated earlier of the number of the magnet segments 6M in the field magnet 6 with the number of the armature windings 7 in the armature assembly 5 would be most suitable for enhancing propulsion as well as improving high response to provide high speed travel and accurate position control for works, even with small and compact in construction and further better in production efficiency. With the sliding device of the present invention, moreover, the field magnet 6, regardless of long dimension including up to eight magnet segments, is set in place without experiencing any sidewise misalignment during reciprocation of the moving table 1.

Figure 5:
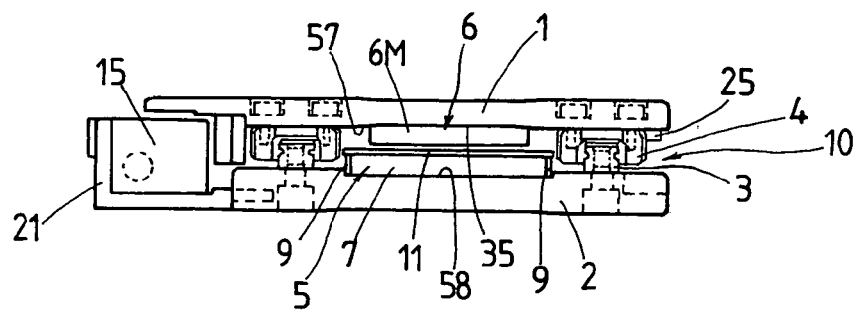
FIG. 5 is a view similar with FIG. 2 to show the sliding device, but an end block being shown removed.
Figure 12:
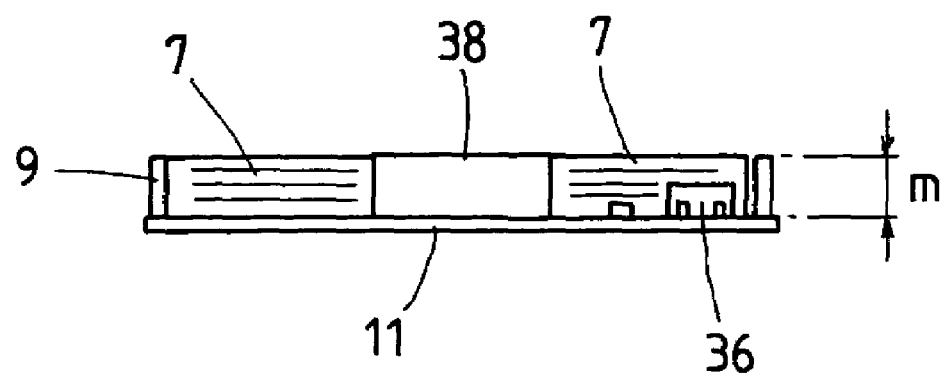
FIG. 12 is a view in side elevation of the armature assembly of FIG. 11.
Figure 13:
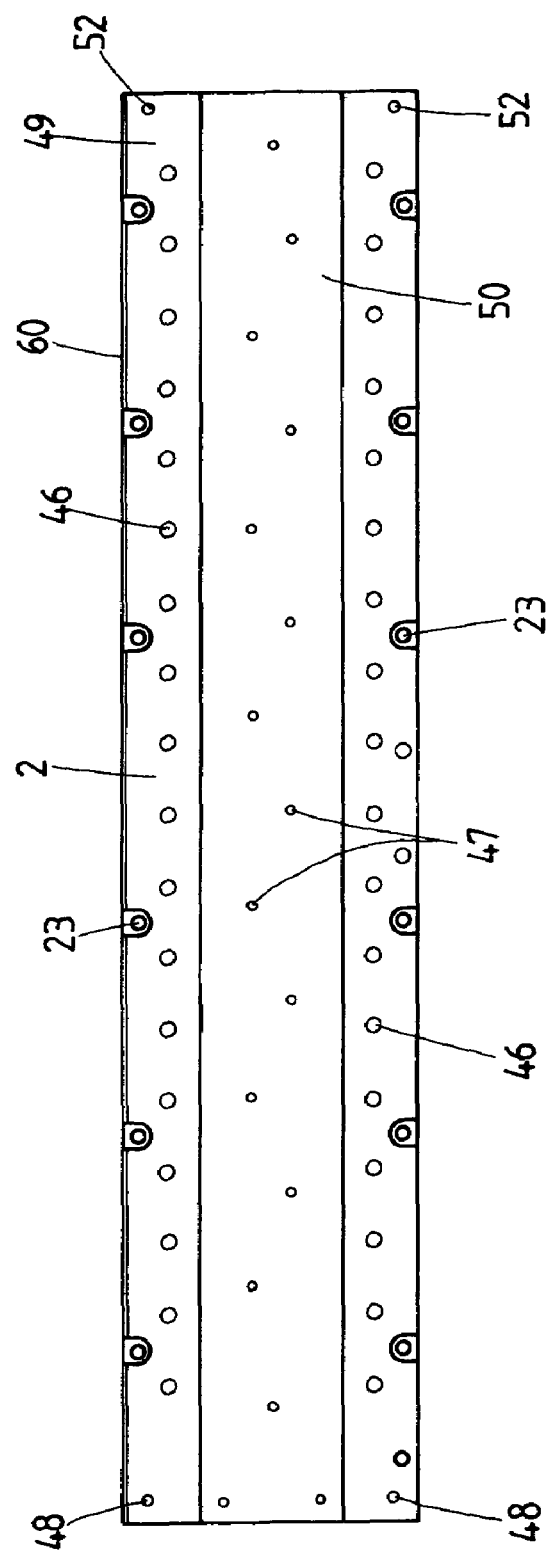
FIG. 13 is a plan view showing a stationary bed in the sliding device of FIG. 1.
Figure 14:
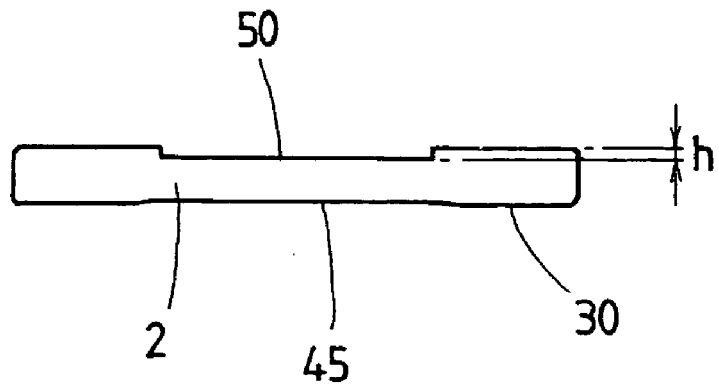
FIG. 14 is a view in side elevation of the stationary bed of FIG. 13.
Figure 15:
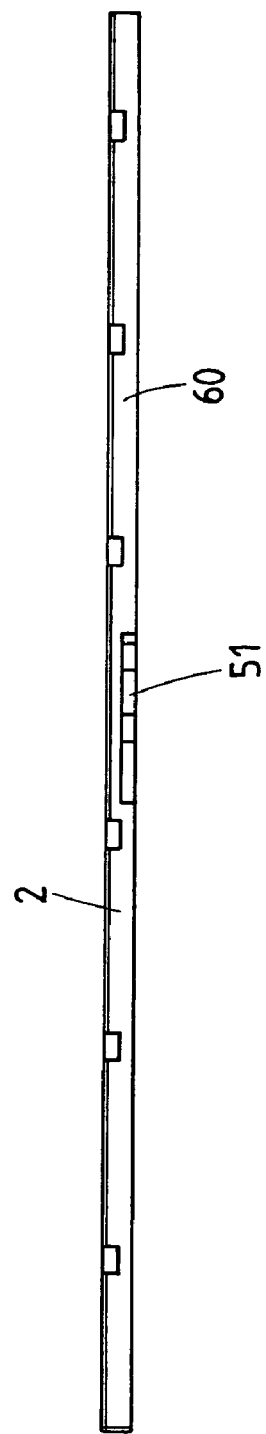
FIG. 15 is a view in front elevation of the stationary bed of FIG. 13.
Figure 16:
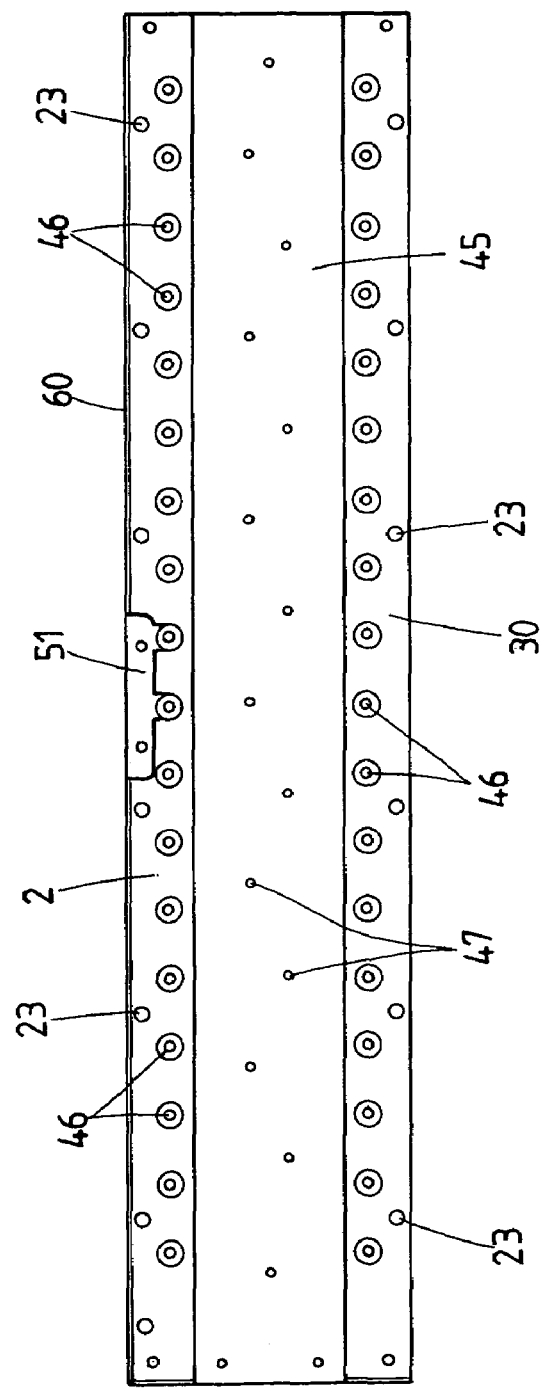
FIG. 16 is a view in rear elevation of the stationary bed of FIG. 13.
Figure 17:
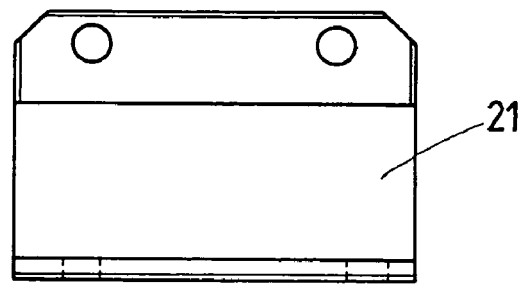
FIG. 17 is a view in plan showing a bracket bearing for a sensor used in the sliding device of FIG. 1.
Figure 18:
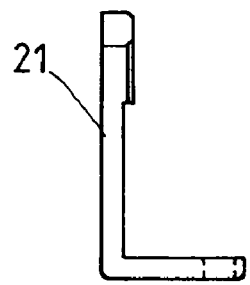
FIG. 18 is a view in side elevation of the bracket bearing of FIG. 17.
Figure 19:
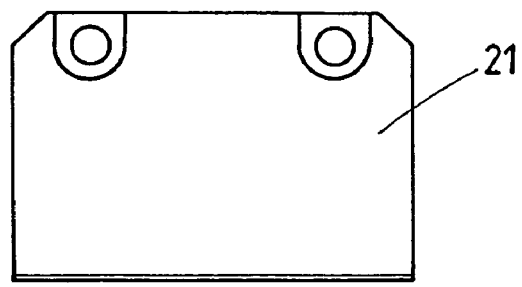
FIG. 19 is a view in rear elevation of the bracket bearing of FIG. 17.
Figure 20:
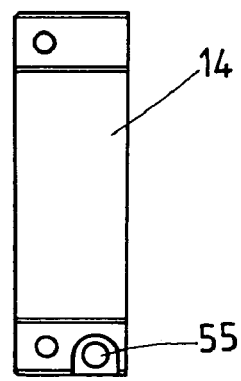
FIG. 20 is a view in plan showing a connector block used in the sliding device of FIG. 1.
Figure 21:
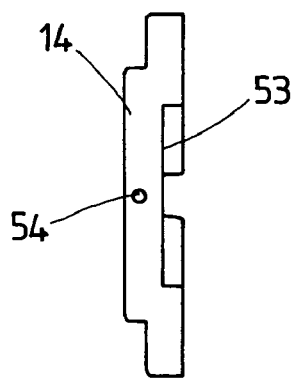
FIG. 21 is a view in side elevation of the connector block of FIG. 20.
Figure 22:
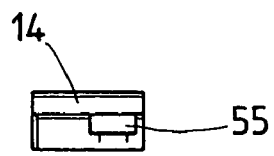
FIG. 22 is a view in front elevation of the connector block of FIG. 20.

The stationary bed 2 of the sliding device constructed as stated earlier, as shown in FIGS. 5, 13 and 14, is made on the upper surface or the second confronting surface 58 thereof with a recess 50, or a second recess, to accommodate the armature windings 7 of the armature assembly 5 therein. The recess 50 is made less in depth than a thickness of the armature winding 7 and cut into the stationary bed 2 in a way extending in the traveling direction of the table 1 with a width enough to receive the armature windings 7. On a lower surface opposite to the second confronting surface 58 of the bed 2, there is provided a relieving groove 45 extending lengthwise of the bed 2. In the relieving groove 45, further, there are made the threaded holes 47 that are used to fasten the armature windings 7 onto the bed 2. The relieving groove 45 is flanked by mounting surfaces 30 of reference, where there are made counter-bored holes 46 that are used to tighten a guide rail to the bed 2, and bolt holes 23 that are used to fasten the bed 2 onto any fixed base. A guide rail 3 is seated on a mating surface 49 of the bed 2 and then fastened to the bed 2 with using screws that extend through the counter-bored holes 46 from below to be driven into matching holes in the guide rail 3. The second recess 50, especially, sinks by a depth (h), which is not as deep as the armature assembly 5 buries itself absolutely in the recess 50, but less than a half, for example a matter of a third, a thickness (m) of the armature winding 7. Thus, the armature assembly 5 lies on the bed 2 in a way rising above the bed 2, as shown in FIGS. 5, 11 and 12. The armature assembly 5 is flanked by covering material 6 extending along widthwise opposing sides 61 of the armature assembly 5 to protect the armature windings 7 against foreign matter.

Altogether, both the table 1 and the bed 2 as a whole, as shown in FIGS. 8 and 14, are made in a flat configuration with nothing but the recesses 35, 50 less in depth. This specific configuration common to the table 1 and bed 2 helps a reduction of manufacturing steps, making sure of high efficiency in production of the table 1 and the bed 2, thereby making it easier to commercialize them. The moving table 1 of flat configuration with nothing raised has a slider 4 that is installed on the flat surface of the table 1 with using locating or knockout pins 25. The slider 4 is fastened to the table 1 by fastening screws 56 that extend through holes in the table 1 to be tightened into matching threaded holes in the slider 4. Since the table 1 and the bed 2 as a whole are made in a flat configuration with nothing raised above them as described earlier, the locating pins or knockout pins 25, as shown in FIGS. 4, 5, 7 and 8, is made on the table 1 to create locating points to determine the slider 4 relative to the table 1 with accuracy. The slider 4 is brought in the first into abutment against the locating pins 25 and then fastened there. With the sliding device constructed as stated earlier, thus, there is no need of the provision of any locating flange along the side of the table 1, as opposed to the prior sliding device. The slider 4 fits over and conforms to the guide rail 3 in a way traveling by virtue of rolling elements interposed between them.

In the sliding device of the present invention, moreover, magnetic sensing elements responding to the field magnet 6 are installed on just six armature windings 7, which are located in the middle of the armature assembly 5. Hall-effect elements or Hall ICs 40 to sense the field magnet 6 are installed in only six armature windings 7 arranged in the middle of the armature assembly 5. The prior sliding device has already existed in which the Hall ICs are assigned to every armature windings 7. In contrast, with the sliding devise of the present invention, the Hall ICs 40 are installed in only six armature windings 7 arranged in the middle of the armature assembly 5. The Hall IC of magnetic sensing element may be easily incorporated into the armature winding 7, synchronized with fabrication of the armature winding 7. When the sliding device operates in normal horizontal posture where the table 1 is allowed to move freely in the traveling direction, the Hall ICs 40 would not have to serve their functions because the duty of the magnetic detection could be performed by just the armature windings 7. Contrary to the above, when the sliding device operates in upstanding posture where the table 1 is prevented from free traveling in every direction owing to any lopsided load in specific direction, the Hall ICs 40 would be valuable for magnetic detection.

With the sliding device of the present invention, moreover, a linear scale 8 of a linear encoder is attached to the first confronting surface 57 of the table 1 in a way extending along any one side 59 of the table 1. The bed 2 is made on any one side 60 thereof with a recess 51, or a third recess, into which a bracket 21 fits to secure a sensor 15 of the linear encoder in opposition to the linear scale 8. The bracket 21 to support the sensor 15 thereon, as shown in FIGS. 3 to 5 and 15 to 19, fits into the recess 51 that is cut at the lengthwise middle on the side 60 of the bed 2. Thus, the sensor 15 will be attached to the bed 2 at the lengthwise middle of the bed 2.

With the sliding device of the present invention, as shown in FIGS. 1, 3, 4 and 20 to 22, the connector block 14 is secured to any lengthwise end of the coil board 11 of the armature assembly 5 at any one of forward and aft ends of the bed 2. The connector block 14, besides serving as a limiter to keep the table 1 from shooting outside the end of the bed 2, may serve protecting terminals 68, shown in FIG. 11, which are connected with an electric power line 17 and signal lines 19. The connector block 14 is further made with a recess 55, or a fourth recess, into which a retainer band 16 fits to a sensor line 18 reaching the sensor 15. That is, the retainer band 16 is provided to hold firmly only the sensor line 18 extending from the sensor 15, apart from the electric power line 17 and signal lines 19 reaching the armature assembly 5. Conventionally, the lines including the electric power line 17, sensor line 18, signal line 19, and so on have been all held with the retainer band 16. Nevertheless, the retainer band 16 is apt to turn together with a screwdriver when tightening the screws to fasten the retainer band 16 to the connector block 14, resulting in causing disconnection of the lines. To cope with this shortcoming, the recess 55 allowing the retainer band 16 to fit into there to hold the sensor line 18 is made in the connector block 14. Working operation for the recess 55 is also made easier by cutting the recess 55 into the connector block 14 rather than the bed 2.

Figure 6:
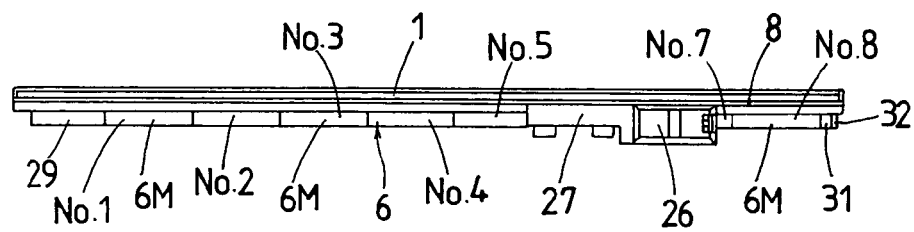
FIG. 6 is a view in front elevation showing a moving table with moving magnet used in the sliding device of FIG. 1.

The table 1, as shown in FIGS. 6 to 8, the table 1 is cut away partially along any one sidewise side or the traveling direction thereof to provide a first step 33 made lowered, and a second step 34 adjoining the first step 33 and further lower than the first step 33. The linear scale 8 of optical scale is secured on the second step 34 while an origin mark 26 is installed using a fixture 27 on the first step 33. The linear scale 8 can be easily set in place by making use of a standing surface defining the second step 34 as a fixed surface of reference against which the linear scale 8 comes into abutment, while the origin mark 26 also can be easily set in place by making use of a standing surface defining the first step 33 as a fixed surface of reference against which the origin mark 26 comes into abutment. The table 1 is further made on the underneath thereof with holes 28 into which fastening screws 56 fit to secure the table 1 to the slider 4.

Figure 10:
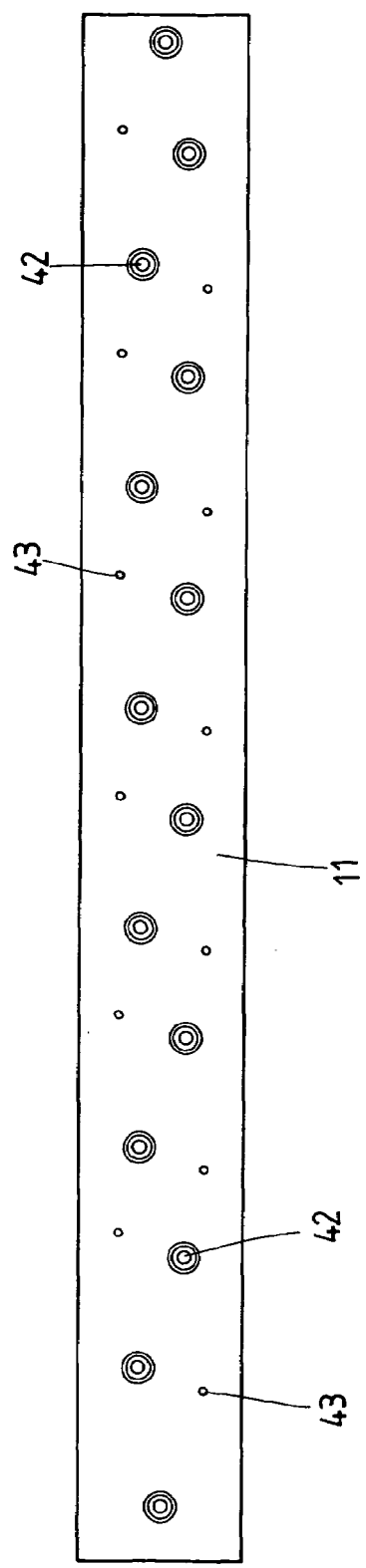
FIG. 10 is a plan view of an armature assembly used in the sliding device of FIG. 1.

Referring to FIGS. 10 and 11, there is shown the armature assembly 5 incorporated in the sliding device of the present invention. Each the armature winding 7 is a coreless winding composed turns wound around a resinous molding 41 in the form of rectangle. The resinous molding 41 serves well to preserve the shape of the armature winding. The resinous molding 41 has locating pins, not shown, which fit into mating holes 43 in the coil board 11 to set in place the armature assembly 5 relatively to the coil board 11. On lengthwise opposing ends of the coil board 11 fastened to the bed 2, there are installed the limit sensors 36 and collars 38. Moreover, before-the-origin sensors 37 are arranged spaced inwards away from the limit sensors 36 in the traveling direction of the table 1. The collars 38 are made of metallic material and, as with other collars 67 arranged respectively within the armature windings 7, serve keeping an interval between the bed 2 and the coil board 11, thereby protecting the armature windings 7.

What is claimed is:

1. A sliding device with onboard moving-magnet linear motor, comprising an elongated bed, a table movable for reciprocation in a lengthwise direction by virtue of a linear motion guide unit, a field magnet of magnet segments lying on a first surface of the table confronting the bed in a way unlike magnetic poles are juxtaposed alternately in polarity in a traveling direction of the table, and an armature assembly having coreless armature windings of rectangular shape, which are installed on a second surface of the bed confronting the table in opposition to the field magnet in lengthwise direction;

wherein the bed an the table are made of magnetic material to provide magnet yoke and coil yoke for constituting a part of magnetic circuits, and the table is made on the first surface thereof with a first recess to set in place the field magnet of the magnet segments on the first surface, the first recess having a depth not more than a third a thickness of the field magnet.

2. A sliding device constructed as recited in claim 1, wherein the first recess cut into the table has the depth of from 0.05 mm to 0.5 mm.

3. A sliding device constructed as recited in claim 1, wherein the field magnet is made up of eight pieces of magnet segment, while the armature assembly is made up of in all twelve armature windings, which are divided into armature winding groups, each of which includes three armature windings for carrying each phase current of three-phase conduction system.

4. A sliding device constructed as recited in claim 1, wherein the bed is made on the second surface thereof with a second recess less in depth than a half a thickness of the armature winding and the armature assembly is flanked by covering materials extending along widthwise opposing sides of the armature assembly to prevent foreign matter against moving in and out.

5. A sliding device constructed as recited in claim 1, wherein the table as a whole is made in a flat configuration with nothing raised above them, while a locating pin is made on any flat area of the table to create a locating point to determine a slider for a linear motion guide unit relative to the table, and wherein the slider fits over and conforms to a guide rail 3 in a way traveling by virtue of rolling elements, thereby providing the linear motion guide unit.

6. A sliding device constructed as recited in claim 1, wherein magnetic sensing elements responding to the field magnet are installed on just six armature windings, which are located in the middle of the armature assembly.

7. A sliding device constructed as recited in claim 1, wherein a linear scale of a linear encoder is attached to the first surface of the table in a way extending along any one side of the table, while the bed is made on any one side thereof with a third recess, into which a bracket fits to secure a sensor of the linear encoder in opposition to the linear scale.

8. A sliding device constructed as recited in claim 7, wherein a connector block is secured to any lengthwise end of a coil board of the armature assembly at any one of forward and aft ends of the bed, and the connector block, besides serving as a limiter to keep the table from shooting outside the end of the bed, serves protecting terminals that are connected with an electric power line and a signal lines, and wherein the connector block is further made with a fourth recess, into which a retainer band fits to a sensor line reaching the sensor.

* * * * *